(12) United States Patent
Lee et al.

(10) Patent No.: US 12,243,537 B2
(45) Date of Patent: Mar. 4, 2025

(54) METHOD OF EDITING SPEECH RECOGNITION RESULT

(71) Applicant: ActionPower Corp., Seoul (KR)

(72) Inventors: Jihwa Lee, Seoul (KR); Hwanseok Choi, Gyeonggi-Do (KR); Jinsuk Park, Seoul (KR); Yunseop Kim, Seoul (KR); Woochan Jeong, Incheon (KR)

(73) Assignee: ActionPower Corp., Seoul (KR)

( * ) Notice: Subject to any disclaimer, the term of this patent is extended or adjusted under 35 U.S.C. 154(b) by 0 days.

(21) Appl. No.: 18/236,777

(22) Filed: Aug. 22, 2023

(65) Prior Publication Data

US 2024/0087576 A1  Mar. 14, 2024

(30) Foreign Application Priority Data

Sep. 8, 2022 (KR) .......................... 10-2022-0113895

(51) Int. Cl.
*G10L 17/14* (2013.01)
*G06F 3/04842* (2022.01)
*G10L 17/02* (2013.01)
*G10L 17/22* (2013.01)
*G10L 25/57* (2013.01)

(52) U.S. Cl.
CPC .......... *G10L 17/14* (2013.01); *G06F 3/04842* (2013.01); *G10L 17/02* (2013.01); *G10L 17/22* (2013.01); *G10L 25/57* (2013.01)

(58) Field of Classification Search
CPC ......... G10L 17/14; G10L 17/02; G10L 17/22; G10L 25/57; G06F 3/04842
See application file for complete search history.

(56) References Cited

U.S. PATENT DOCUMENTS

| | | | |
|---|---|---|---|
| 6,006,183 A | 12/1999 | Lai et al. | |
| 6,076,059 A * | 6/2000 | Glickman | G10L 15/26 704/E15.045 |
| 6,122,614 A * | 9/2000 | Kahn | G10L 15/063 704/270 |
| 6,151,576 A * | 11/2000 | Warnock | G10L 15/26 704/235 |
| 2003/0069729 A1 * | 4/2003 | Bickley | G10L 15/08 704/E15.014 |
| 2004/0117740 A1 | 6/2004 | Chen et al. | |

(Continued)

FOREIGN PATENT DOCUMENTS

| | | |
|---|---|---|
| KR | 10-1999-0062566 A | 7/1999 |
| KR | 10-2020-0087514 A | 7/2020 |

(Continued)

*Primary Examiner* — Fariba Sirjani
(74) *Attorney, Agent, or Firm* — MARSHALL, GERSTEIN & BORUN LLP

(57) ABSTRACT

Disclosed is a method of editing a speech recognition result, the method being performed by a computing device. The method may include: displaying a word list satisfying a predetermined condition based on text information generated by speech recognition; determining a target word within the word list; and displaying a region corresponding to the target word within the text information, in which the predetermined condition includes at least one of predetermined word information for each user account and predetermined threshold information associated with a frequency of occurrence of a word.

15 Claims, 12 Drawing Sheets

(56) References Cited

U.S. PATENT DOCUMENTS

| | | | |
|---|---|---|---|
| 2005/0159957 A1* | 7/2005 | Roth | G10L 15/26 |
| | | | 704/276 |
| 2005/0203750 A1* | 9/2005 | Miyamoto | G10L 15/26 |
| | | | 704/276 |
| 2006/0206806 A1* | 9/2006 | Han | G06F 16/345 |
| | | | 715/236 |
| 2007/0011012 A1* | 1/2007 | Yurick | G10L 15/26 |
| | | | 704/277 |
| 2008/0120102 A1* | 5/2008 | Rao | G10L 15/22 |
| | | | 704/E15.04 |
| 2008/0177536 A1* | 7/2008 | Sherwani | G11B 27/034 |
| | | | 704/E15.04 |
| 2008/0189605 A1* | 8/2008 | Kay | G06F 40/274 |
| | | | 715/257 |
| 2010/0031142 A1* | 2/2010 | Nagatomo | G06F 16/345 |
| | | | 704/235 |
| 2010/0274667 A1* | 10/2010 | Lanham | G06Q 30/0251 |
| | | | 707/E17.103 |
| 2011/0054901 A1* | 3/2011 | Qin | G06F 40/45 |
| | | | 704/E15.005 |
| 2013/0298016 A1* | 11/2013 | Chigier | G06F 40/166 |
| | | | 715/256 |
| 2013/0325884 A1* | 12/2013 | Soel | G06F 40/194 |
| | | | 707/E17.058 |
| 2017/0300532 A1* | 10/2017 | Simhon | G06F 11/0751 |
| 2021/0074277 A1 | 3/2021 | Lewis | |
| 2021/0233535 A1* | 7/2021 | Shir | G10L 15/22 |
| 2022/0093103 A1 | 3/2022 | Shin et al. | |
| 2022/0115019 A1 | 4/2022 | Bradley et al. | |
| 2023/0281248 A1* | 9/2023 | Schalkwyk | G06F 40/30 |
| | | | 707/749 |

FOREIGN PATENT DOCUMENTS

| | | |
|---|---|---|
| KR | 10-2022-0009319 A | 1/2022 |
| KR | 102361831 B1 | 2/2022 |
| KR | 10-2022-0040445 A | 3/2022 |
| KR | 102374405 B1 | 3/2022 |
| KR | 10-2022-0043753 A | 4/2022 |
| KR | 10-2022-0068716 A | 5/2022 |
| KR | 102431754 B1 | 8/2022 |

* cited by examiner

Fig.9

METHOD OF EDITING SPEECH RECOGNITION RESULT

CROSS-REFERENCE TO RELATED APPLICATIONS

This application claims priority to and the benefit of Korean Patent Application No. 10-2022-0113895 filed in the Korean Intellectual Property Office on Sep. 8, 2022, the entire contents of which are incorporated herein by reference in its entirety.

TECHNICAL FIELD

The present disclosure relates to a method of editing a speech recognition result, and more particularly, to a technology for editing text output as a speech recognition (Speech To Text (STT)) result.

BACKGROUND

The text output from a speech recognition (Speech To Text (STT)) model is incomplete, so proofreading is essential for the user to actually utilize the speech recognition (STT) service provided. In addition, the utility of speech recognition (STT) services may be increased if users can edit (for example, underline, bold, or italic) the text for their own purposes and convert or export the text to external programs (for example, MS word) by reflecting the edition.

In particular, usability may be improved if users find keywords and text that is synchronized to the currently playing speech spot is displayed in a process of directly editing, by the user, the results of speech recognition (STT) performance. Also, since the results of the speech recognition (STT) performance are incomplete, usability may be improved if a user is able to search for and fix similarly pronounced words at once.

Korean Patent No. 10-2361831 (Feb. 8, 2022) discloses a method of performing editing of a document based on speech recognition and a device using the same.

SUMMARY

The present disclosure has been conceived in response to the foregoing background art, and has a purpose of improving usability for a user in providing speech recognition (Speech To Text (STT)) services. For example, the present disclosure has a purpose of providing a method of editing a speech recognition result that allows users to directly correct and edit incomplete speech recognition (STT) result text, that is capable of converting text to an external program by reflecting correction and edition, and that may improve usability for users in correcting and editing speech recognition (STT) result text by displaying keywords, text-to-speech synchronization, bulk searching for similar words, and the like.

On the other hand, the technical problem to be achieved by the present disclosure is not limited to the technical problem mentioned above, and various technical problems may be included within the range obvious to those skilled in the art from the content to be described below.

An exemplary embodiment for implementing the foregoing technical problem provides a speech recognition method performed by a computing device, the speech recognition method including: displaying a word list satisfying a predetermined condition based on text information generated by speech recognition; determining a target word within the word list; and displaying a region corresponding to the target word in the text information, in which the predetermined condition includes at least one of predetermined word information for each user account and predetermined threshold information associated with a frequency of occurrence of a word.

Alternatively, the method may further include, when the region corresponding to the target word is selected, displaying information concerning a speech frame synchronizable with the region corresponding to the target word together among speech frames of an original speech that is a target of the speech recognition.

Alternatively, the speech recognition may be performed on a speech included in a video, and the method may further include, when the region corresponding to the target word is selected, displaying information concerning an image frame synchronizable with the region corresponding to the target word together among image frames of the video.

Alternatively, the method may further include: performing a correction on at least one word in the text information based on input information received through a user interface; and based on the input information received through the user interface, changing a display manner for a partial region within the text information.

Alternatively, the method may further include converting corrected text information, in which the correction of the at least one word and the change of the display manner for the partial region are reflected, into a format for an external program.

Alternatively, the method may further include: receiving input of a search target word through a user interface; determining an additional search target word associated with said search target word; and searching for both said search target word and said additional search target word in said text information.

Alternatively, the determining of the additional search target word associated with the search target word includes determining an additional search target word associated with the search target word based on an edit distance analysis.

Alternatively, the determining of the additional search target word associated with the search target word based on an edit distance analysis may include: determining a threshold for an edit distance associated with the search target word; determining, among words included in the text information, a word of which an edit distance to the search target word is equal to or less than the threshold; and determining the determined word as the additional search target word.

Alternatively, the method may further include generating summarization information about the text information based on at least one of a summarization range set in relation to the text information, speaker information about the text information, and topic information about the text information.

Alternatively, the generating of the summarization information may include: determining whether a type of summarization target text is a prose type or an interactive type; and applying a summarization algorithm differently depending on the determined type.

Alternatively, the generating of the summarization information may include: receiving setting information regarding a length of a summarization result; and determining, based on the setting information regarding the length of the summarization result, at least one of the number of paragraphs, the number of sentences, or the number of words included in the summarization result.

Alternatively, the method may further include: separating text included in the text information by speaker; and determining or correcting a name of a speaker associated with the separated text.

Alternatively, the determining or correcting of the name of the speaker associated with the separated text may include: displaying a list of determined or corrected speakers in relation to a preceding text portion; additionally displaying a speaker having the highest probability in the displayed list of speakers; and finally determining or correcting, based on input information received through a user interface, the name of the speaker associated with the separated text.

Alternatively, the method may further include: receiving user input information selecting at least one word included in the text information; and displaying a candidate word for replacing the selected word, based on at least one of information related to the speech recognition or information on interworking with an external server.

Alternatively, the displaying of the candidate word for replacing the selected word may include: identifying a speech signal portion corresponding to the selected word; identifying another predicted word considered as the prediction of the identified speech signal portion in the speech recognition process; and displaying the other identified predicted word as the candidate word.

Alternatively, the method may further include: in connection with the speech recognition, calculating confidence of each of the words included in the text information; identifying, among the words included in the text information, a word of which confidence is equal to or less than a threshold; and distinguishing and displaying the identified word.

Another exemplary embodiment for implementing the foregoing technical problem provides a computer program stored in a non-transitory computer-readable storage medium. When the computer program is executed by one or more processors, the computer program performs following operations for editing a speech recognition result, the operations including: an operation of displaying a word list satisfying a predetermined condition based on text information generated by speech recognition; an operation of determining a target word within the word list; and an operation of displaying a region corresponding to the target word in the text information, and the predetermined condition includes at least one of predetermined word information for each user account or predetermined threshold information associated with a frequency of occurrence of a word.

Still another exemplary embodiment of the present disclosure provides a computing device. The computing device includes: a processor including at least one cores; and a memory, in which the at least one processor displays a word list satisfying a predetermined condition based on text information generated by speech recognition, determines a target word in the word list, displays a region corresponding to the target word within the text information, and the predetermined condition includes at least one of predetermined word information for each user account and predetermined threshold information associated with a frequency of occurrence of a word.

The present disclosure may improve usability of a user in providing speech recognition (Speech To Text (STT)) services. For example, the present disclosure may provide a method of editing a speech recognition result that allows users to directly correct and edit incomplete speech recognition (STT) result text, that is capable of converting or exporting text to an external program by reflecting correction and edition, and that may improve usability for users in correcting and editing speech recognition (STT) result text by displaying keywords, text-to-speech synchronization, bulk searching for similar words, and the like.

On the other hand, the effect of the present disclosure is not limited to the above-mentioned effects, and various effects may be included within the range apparent to those skilled in the art from the content to be described below.

BRIEF DESCRIPTION OF THE DRAWINGS

FIG. 9 is a diagram illustrating an example of a user interface screen for determining an additional search target word associated with a search target word according to the exemplary embodiment of the present disclosure.

DETAILED DESCRIPTION

Figure 1:
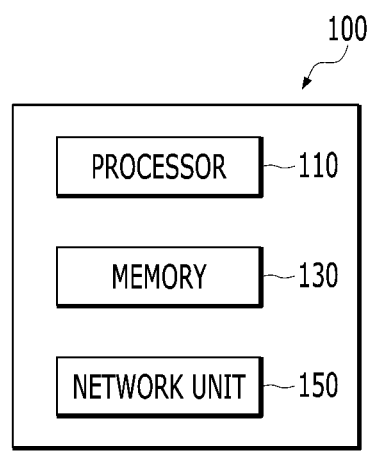
FIG. 1 is a block diagram illustrating a computing device for editing a speech recognition result according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram illustrating a computing device for editing a speech recognition result according to an exemplary embodiment of the present disclosure.

FIG. 1 is a block diagram of a computing device for detecting a voice from audio data according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to the exemplary embodiment of the present disclosure, the processor 110 may provide a user interface that allows a user to directly edit the text output as a result of speech recognition (Speech-To-Text (STT)). Specifically, the processor 110 may provide a user editor having a keyword display function for a speech recognition (STT) result text, a speech-to-text synchronization function, a similar word bulk search function, a function of converting or exporting text by reflecting user edits, a function of highlighting text with low confidence in the speech recognition result text, and a function of, when a user selects a word in a result text, suggesting other candidate words for the corresponding word. In other words, the processor 110 may provide the speech recognition performance result text through a user interface, improve usability and enhancing the user's convenience in correcting and editing.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 110 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The network unit 150 according to an exemplary embodiment of the present disclosure may use an arbitrary type known wired/wireless communication systems.

Figure 2:
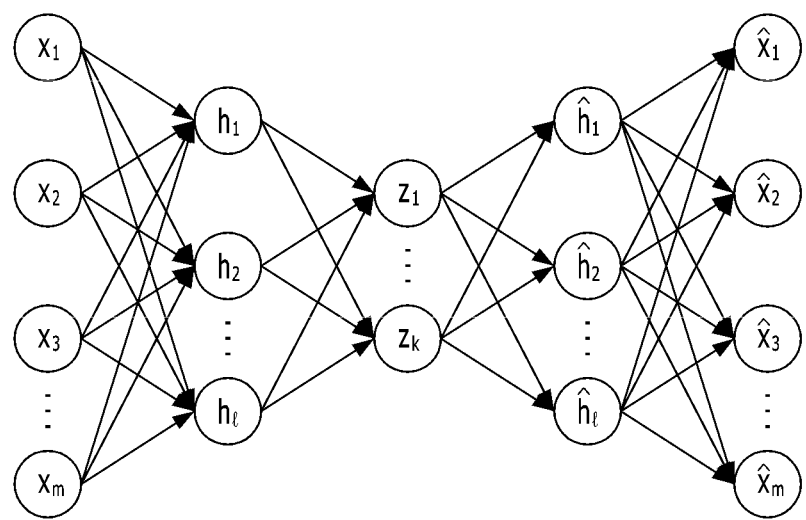
FIG. 2 is a schematic diagram illustrating a network function according to an exemplary embodiment of the present disclosure.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the training data may be generally a subset of actual data (i.e., data to be processed using the learned neural network), and as a result, there may be a learning cycle in which errors for the training data decrease, but the errors for the actual data increase. Overfitting is a phenomenon in which the errors for the actual data increase due to excessive learning of the training data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of learning, utilization of a batch normalization layer, etc., may be applied.

According to the exemplary embodiment of the present disclosure, the speech recognition (Speech-To-Text (STT) or Automatic Speech Recognition (ASR)) described herein is a dictation technique for changing speech into text. An input of the speech recognition (STT) may include at least one of a speech signal, a spectrogram in which a speech signal is converted, or speech features. Also, an output of the STT is text in the form of a character string. On the other hand, the speech recognition (STT) model may be implemented in various forms of model including the neural network model discussed above. The speech recognition (STT) model may be divided into a modulated scheme and a non-modulated end-to-end (e2e) scheme depending on the implementation scheme. Here, the modularized scheme may include, but is not limited to, acoustic models (models that represent how speech signals can be represented), linguistic models (models that assign probabilities of occurrence to words based on the given sentences and words), traditional models that perform speech recognition by dividing speech based on a pronunciation dictionary and the like (for example, some ASR models among Kaldi toolkit-based ASR models, and Hybrid-ASR models). On the other hand, the non-modulated scheme mainly refers to e2e models (for example, transformer-based encoder decoder models), where the model may be generated by training a lot of data without having submodules. On the other hand, representative decoding technique is a beam search technique, which is a method of finding the most optimal correct answer by considering the entire sentence while opening to various possibilities, rather than just predicting the closest word to the correct answer in a given context.

According to the exemplary embodiment of the present disclosure, the computing device 100 may include an input module capable of receiving input for correction and edition from a user, input for words to be searched, and the like via an input device. Additionally, the computing device 100 may include a display module for displaying speech recognition performance result text, text reflecting corrections and edits made by the user, word lists, word search windows, and the like. Additionally, the computing device 100 may include a word display and search module capable of displaying a word list and determining (or searching for) a target word within the word list. Additionally, the computing device 100 may include a text-to-speech synchronization display module that displays, when a user clicks somewhere in the speech recognition result text or a speech playback bar, a point corresponding to the speech playback bar or the speech recognition result text according to the synchronization. Additionally, the computing device 100 may include a text-to-video synchronization display module that determines whether a file for performing speech recognition is a video file and, when the file for performing the speech recognition is the video file, synchronizes image frames of the video file with speech recognition result text and speech based on the user input. Additionally, the computing device 100 may include a user correction and edit reflection module that reflects corrections or edits made by a user to the speech recognition result text. In addition, the computing device 100 may include a conversion module that reflects the correction and the edits by the user to the text and exports the text to an external program. Additionally, the computing device 100 may include a similar word search module that finds words that are similar to the words searched by the user in the speech recognition result text. Further, the computing device 100 may include a summarization module that generates summarization information about the text information based on at least one of a summarization range set in relation to the text information, speaker information about the text information, or topic information about the text information. In addition, the computing device 100 may include a candidate word suggestion module that, in response to the selected word, displays candidate words to replace the selected word based on at least one of information related to speech recognition and information on interworking with an external server. Further, in connection with speech recognition, the computing device 100 may include a confidence display module that calculates confidence of each of the words included in the text information to identify and display a word whose confidence is equal to or less than a threshold. In the meantime, the plurality of modules that may be included in the computing device 100 may be controlled by the processor 110, or implemented by the operation of the processor 110. Further, modules that may be included in the computing device 100 in connection with editing speech recognition results are not limited to the plurality of modules discussed above, and additional modules may be included. Hereinafter, an exemplary plurality of modules for editing speech recognition results will be described in more detail with reference to FIGS. 3 to 10.

Figure 3:
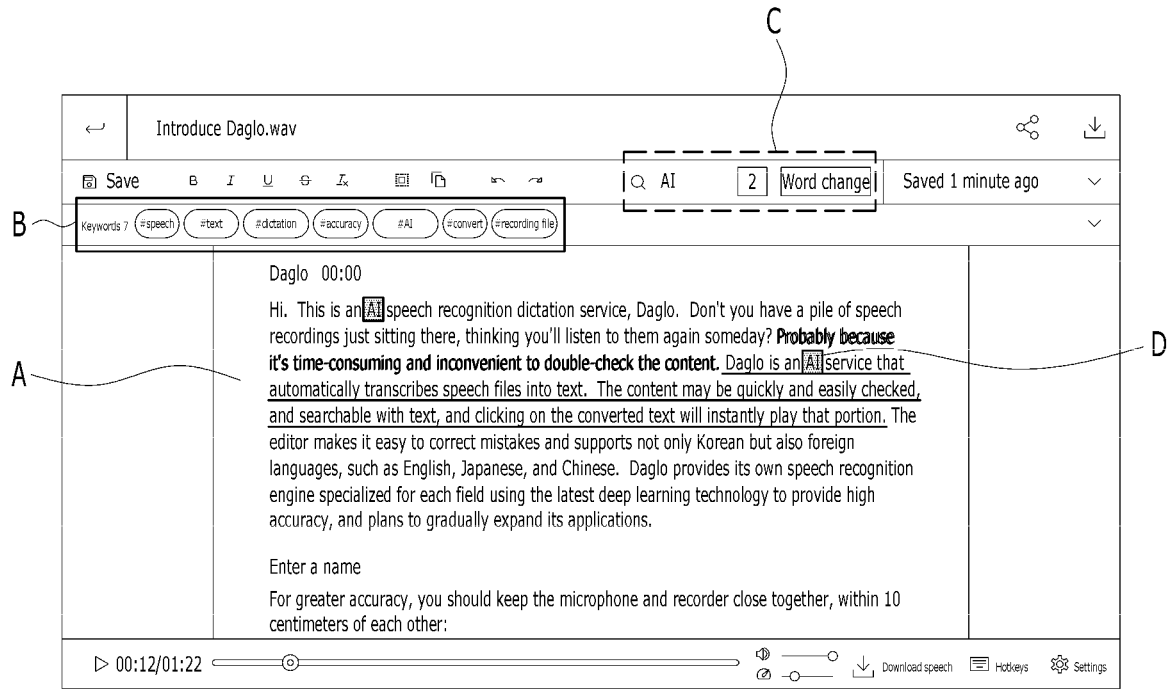
FIG. 3 is a diagram illustrating an example of a user interface screen displaying a speech recognition result text editor according to an exemplary embodiment of the present disclosure.

FIG. 3 is a diagram illustrating an example of a user interface screen displaying a speech recognition result text editor according to an exemplary embodiment of the present disclosure. In one example, FIG. 3 is a diagram for illustrating the word display and search module that is capable of displaying a word list and determining (or searching for) a target word within the word list.

According to the exemplary embodiment of the present disclosure, the processor 110 may display a word list B that satisfy a predetermined condition based on text information A generated by the speech recognition. Here, the predetermined condition may include at least one of predetermined word information for each user account and predetermined threshold information regarding the frequency of occurrence of the word. For example, the processor 110 may display a word list corresponding to a keyword in the speech recognition result text information A, based on the predetermined keyword information for each user account. Further, the processor 110 may identify words whose frequency of occurrence exceeds a predetermined threshold, within the speech recognition result text information A, and may display a word list B for the identified words. Further, the processor 110 may determine a target word C within the word list B. Further, the processor 110 may display D a region that corresponds to the target word C within the text information A. For example, referring to FIG. 3, the processor 110 may determine the target word C as "AI" based on user input from among the words "speech, text, dictation, accuracy, AI, conversion, and recording file" included in the word list B, detect the target word C in the speech recognition result text information A, and display D the region corresponding to the target word C in a predetermined manner (for example, highlight).

Figure 4:
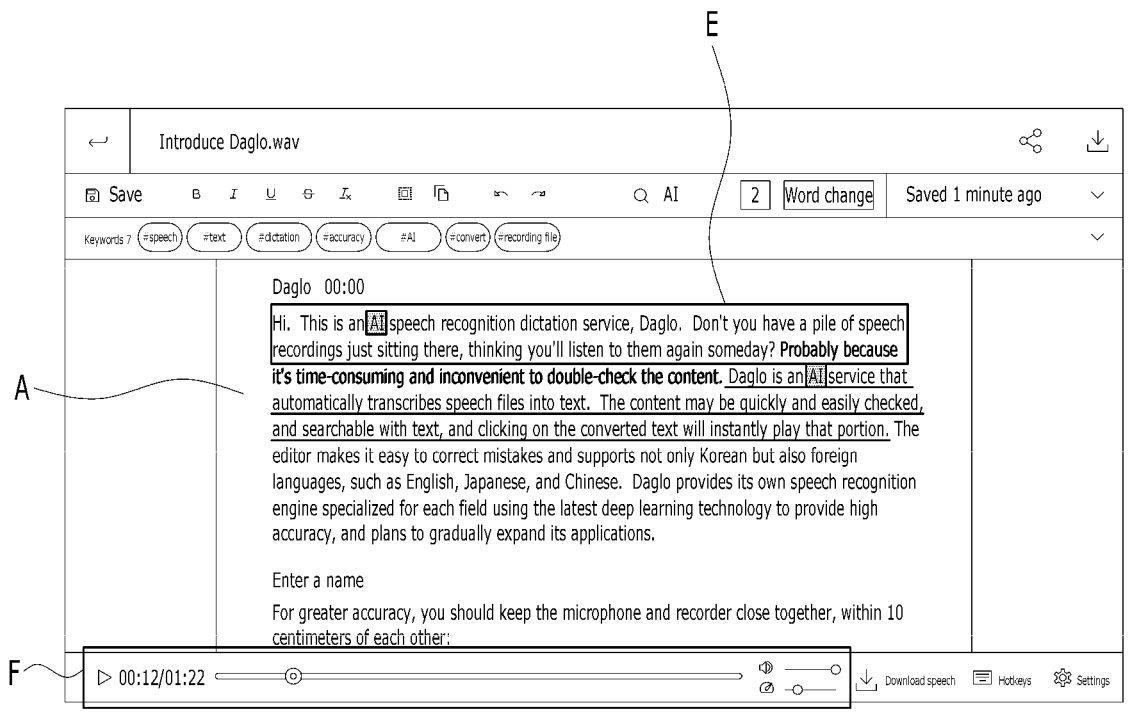
FIG. 4 is a diagram illustrating an example of a user interface screen displaying information about a speech frame according to the exemplary embodiment of the present disclosure.

FIG. 4 is a diagram illustrating an example of a user interface screen displaying information about a speech frame according to the exemplary embodiment of the present disclosure. For example, FIG. 4 is a diagram for illustrating the text-to-speech synchronization display module that displays, when a user clicks somewhere in the speech recognition result text or a speech playback bar, a point corresponding to the speech playback bar or the speech recognition result text according to the synchronization.

According to the exemplary embodiment of the present disclosure, when the region corresponding to the target word is selected, the processor 110 may display information about a speech frame which may be synchronized with the region corresponding to the target word among speech frames of an original speech that is the target of the speech recognition together. Furthermore, even when a region other than the target word is selected in the speech recognition result, the processor 110 may display information about a speech frame that may be synchronized with the region corresponding to the selected word among the speech frames of the original speech that is the target of the speech recognition together. For example, when the user selects any one of the text information A generated by the speech recognition or a speech playback bar F through the user interface, the corresponding portions may be displayed on the speech playback bar F and the text E generated by speech recognition, respectively, depending on the speech-to-text synchronization. At this time, the processor 110 may apply a color change or the like to the synchronized portion to distinguish the synchronized portion within the text information A generated by the speech recognition, as indicated with E.

Figure 5:
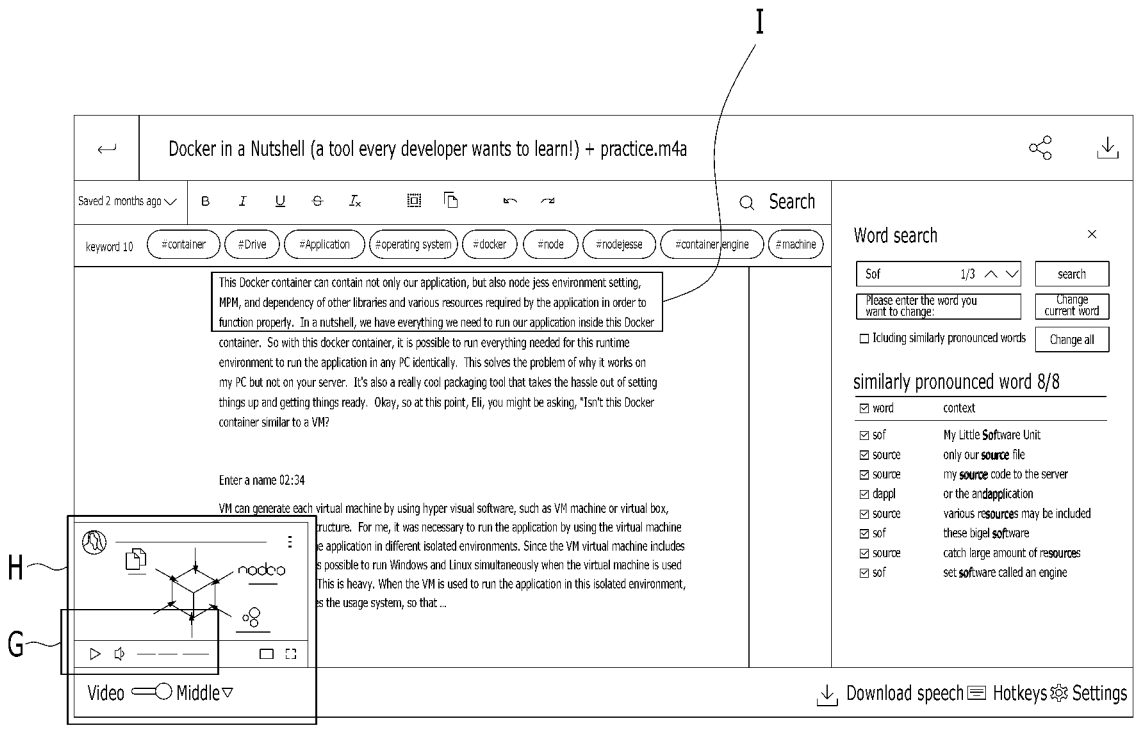
FIG. 5 is a diagram illustrating an example of a user interface screen displaying information about an image frame according to the exemplary embodiment of the present disclosure.

FIG. 5 is a diagram illustrating an example of a user interface screen displaying information about an image frame according to the exemplary embodiment of the present disclosure. For example, FIG. 5 is a diagram for illustrating a text-to-video synchronization display module that determines whether a file for performing speech recognition is a video file and, when the file for performing the speech recognition is the video file, synchronizes image frames of the video file with speech recognition result text and speech based on the user input.

According to the exemplary embodiment of the present disclosure, the processor 110 may determine whether the file for performing speech recognition is a video file or a speech file prior to performing speech recognition. Additionally, the processor 110 may perform speech recognition on the speech included in the video when the corresponding file is a video. Furthermore, when a region corresponding to the target word is selected, the processor 110 may display information regarding an image frame to be synchronized with the region corresponding to the target word among the image frames of the video together. Additionally, when a region corresponding to any one of the plurality of words (other than the target word) included in the text information generated by the speech recognition is selected, the processor 110 may display information regarding an image frame that may be synchronized with the region corresponding to the selected word among the image frames of the video together. For example, referring to FIG. 5, when a particular text region I is selected among the speech recognition result text information, the processor 110 may display information about an image frame that may be synchronized with the selected text region I among the image frames of the video through a playback bar G, an actual screen H of the corresponding image frame, or the like. Conversely, when a particular image frame among the image frames of the video is selected through the playback bar G or the like, the processor 110 may also display a text region I that may be synchronized with the selected image frame in the speech recognition result text information.

Figure 6:
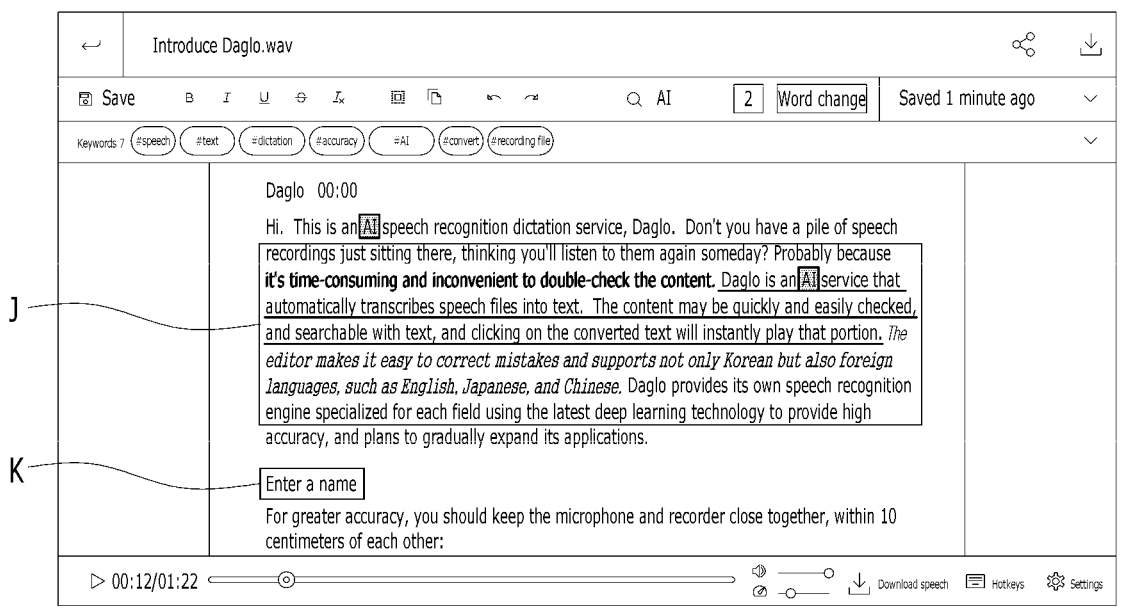
FIG. 6 is a diagram illustrating an example of a user interface screen displaying user correction and editing reflections according to the exemplary embodiment of the present disclosure.

FIG. 6 is a diagram illustrating an example of a user interface screen displaying user correction and editing reflections according to the exemplary embodiment of the present disclosure. For example, FIG. 6 is a diagram for illustrating a user correction and edit reflection module that reflects corrections or edits made by a user to the speech recognition result text through a user interface.

According to the exemplary embodiment of the present disclosure, the processor 110 may perform a correction on at least one word in the text information based on input information received through the user interface. Additionally, the processor 110 may change a display manner for some regions within the text information based on the input information received through the user interface. The display manner may include bold, underline, italic, and the like. For example, referring to region J in FIG. 6, when a user corrects the text "probably because it's time-consuming and inconvenient to double-check the content" through the user interface as shown in K, the display manner of the corresponding text may be changed to bolding. Additionally, the processor 110 may receive speaker names directly through the user interface when speaker separation is applied, as shown in K. For example, the processor 110 may identify the presence of multiple speakers in the original speech based on type analysis of the spectrogram for the original speech, analysis of the size, amplitude, frequency, and the like of multiple speech signals in the original speech, analysis of the original speech by using a statistical acoustic model, and the like, display that portions separated after the separation of the speech recognition result text information into a plurality of portions are portions spoken by different speakers, and also receive speaker name information for the separated speakers as input through the user interface.

Figure 7:
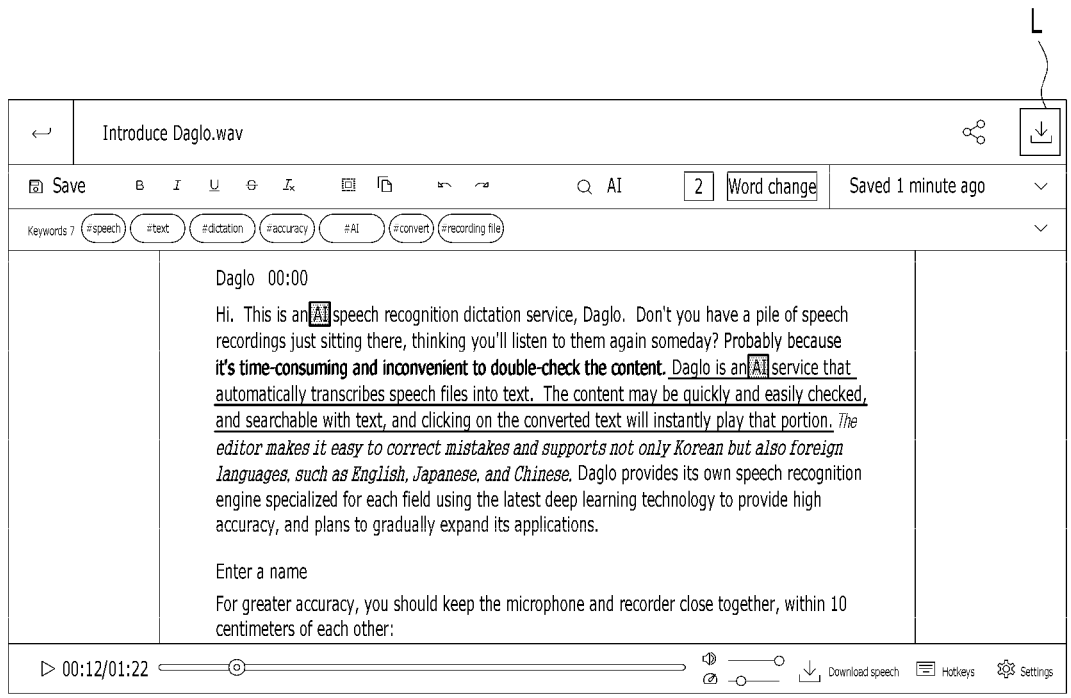
FIG. 7 is a diagram illustrating an example of a user interface screen for converting corrected text information into a format of an external program according to the exemplary embodiment of the present disclosure.
Figure 8:
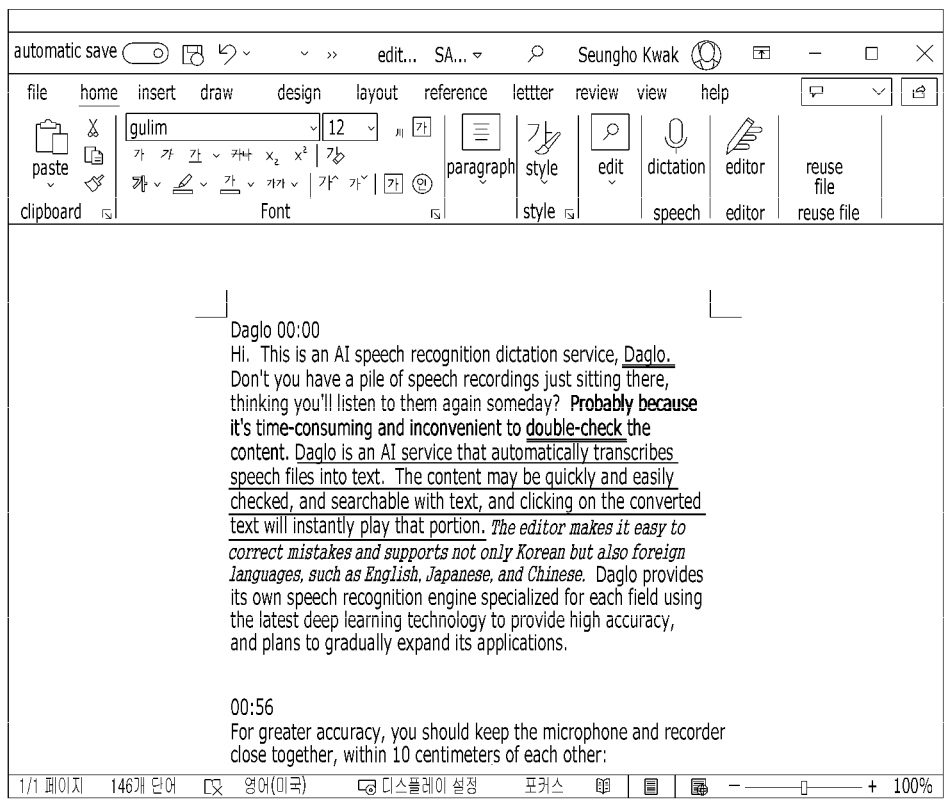
FIG. 8 is a result of converting corrected text information into an external program according to the exemplary embodiment of the present disclosure.

FIG. 7 is a diagram illustrating an example of a user interface screen for converting corrected text information into a format of an external program according to the exemplary embodiment of the present disclosure, and FIG. 8 is a result of converting corrected text information into an external program according to the exemplary embodiment of the present disclosure. For example, FIGS. 7 and 8 are diagrams for illustrating a conversion module that reflects the correction and the edits by the user to the text and exports the text to an external program.

According to the exemplary embodiment of the present disclosure, the processor 110 may convert or extract the corrected text information, in which corrections to at least one word and changes to the display manner for some regions are reflected, into a format for an external program. For example, when input information indicating the selection of a convert button L is received through the user interface, the processor 110 may perform a conversion or extraction to a format for an external program. For example, external programs may include hwp, MS word, txt, smi, srt, and xmi. In other words, the processor 110 may reflect the user's corrections and edits performed in the user correction and edit reflection module illustrated in FIG. 6 to the text and convert the corrected text information into a format (for example, MS word) as shown in FIG. 8. For reference, when an external program (for example, a word processor) is downloaded, the processor 110 may perform the format conversion while retaining the corrected text information that reflects the correction and the change in the display manner for some regions, as shown in FIG. 8. In the meantime, the processor 110 may also recommend a type of external program, based on the corrected or edited matters. For example, when the corrected or edited matters are only compatible with a particular program among a plurality of external programs, the processor 110 may perform a recommendation action specific to the corresponding that external program. According to another exemplary embodiment, in response to receiving "user input information indicative of selecting a button to share the results of speech recognition and editing" through the user interface, the processor 110 may generate and provide the user with a link to share the result text according to the speech recognition and editing.

Figure 9:
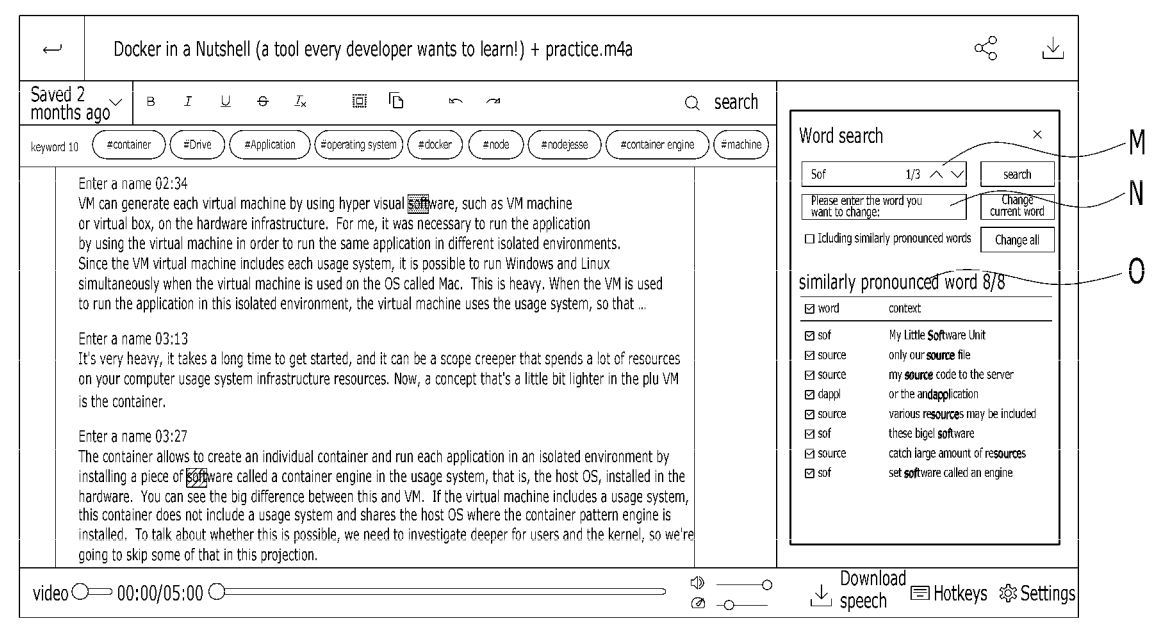

FIG. 9 is a diagram illustrating an example of a user interface screen for determining an additional search target word associated with a search target word according to the exemplary embodiment of the present disclosure. For example, FIG. 9 is a diagram illustrating a similar word search module that finds words that are similar to the words searched for by the user in the speech recognition result text.

According to the exemplary embodiment of the present disclosure, the processor 110 may receive input of a search target word through a user interface. Referring to FIG. 9, the processor 110 may receive input of a search target word (for example, sof) in a search item M through the user interface. Further, the processor 110 may determine an additional search target word (for example, a similar word) associated with the search target word. Here, the processor 110 may determine a word that is determined to be similar in pronunciation to the search target word based on a pronunciation analysis as an additional search target word. Further, the processor 110 may determine an additional search target words O associated with the search target word based on an edit distance analysis. Specifically, the processor 110 may calculate an edit distance between each of the plurality of words included in the speech recognition result and the search target word, and may determine words whose calculated edit distances are equal to or less than a threshold among the plurality of words as additional search target words. For example, as shown in FIG. 9, when the search target word is "sof," the processor 110 may determine words, such as "sos," "gof," and "gofl", of which edit distances from "sof" are equal to or less than the threshold among the words included in the speech recognition result text information as additional search target words.

According to the exemplary embodiment of the present disclosure, the processor 110 may utilize a dynamic threshold when an additional search target word associated with a search target word is determined based on the edit distance analysis. For example, the processor 110 may dynamically determine a threshold for the edit distance in response to the length of the search target word. More specifically, the processor 110 may dynamically determine a threshold for the edit distance based on an operation between the length of the search target word and a predetermined ratio threshold. For example, the processor 110 may determine a dynamic threshold for each search target word by multiplying the length of the search target word by the ratio threshold and rounding the result value to an integer. Herein, the ratio threshold may be predetermined, or determined by a neural network model. Additionally, when a search target word set including a plurality of search target words is generated, the processor 110 may use resources efficiently by dynamically setting a threshold based on the length of each of the search target words included in the search target word set.

According to the exemplary embodiment of the present disclosure, when an additional search target word associated with a search target word based on the edit distance analysis is determined, the processor 110 may search for an additional search target word in consideration of both a "dynamic threshold" (for example, a dynamic threshold based on the ratio threshold discussed above) and an "absolute threshold". For example, the processor 110 may determine the word of which the edit distance from the search target word is equal to or less than "dynamically determined threshold" and equal to or less than the "absolute threshold" among the words included in the speech recognition result text information. That is, the processor 110 may also identify words that simultaneously satisfy both the dynamic threshold and the absolute threshold in the relationship with the search target word, and may also determine the corresponding words as additional search target words (similar words). Meanwhile, when there are multiple search target words, the processor 110 may generate a search target word set Q'={q1, q2, . . . , qn} that includes the plurality of search target words, and may further search for words that are similar in pronunciation to the search target word set in the speech recognition result text information. Further, the processor 110 may determine, based on the edit distance analysis, an additional search target word set associated with the search target word set. For example, the processor 110 may dynamically determine a respective threshold for each of the plurality of search target words included in the search target word set, identify similar words of each of the search target words based on the determined threshold (that is, identify words whose edit distances to the search target word are equal to or less than the respective dynamic thresholds), and generate the additional search target word set based on the identified words.

In the meantime, the edit distance referred to above may be determined in a variety of ways. For example, the edit distance may be defined as the minimum number of edits required to convert one of the character strings to the other when there are two character strings. Furthermore, the type of edit may include deletion, insertion, substitution, and the like. Furthermore, the edit distance may be computed based on a phonetic basis or computed based on a textual basis. For example, the edit distance may be computed based on the conversion of text to phonetic symbols, or computed based on the text itself (for example, computed on a phoneme basis). On the other hand, edit distance algorithms may include Levenshtein distance, longest common subsequence, Hamming distance, and the like, and many various algorithms other than the foregoing algorithms.

When a naïve edit distance algorithm or a simple edit distance computation algorithm is used when a character string section in which an edit distance from a predetermined element of a search target word Q' among the text information T is equal to or less than a threshold is searched for the speech recognition result text information T and the search target word set Q'={q1, q2, . . . , qn} (where T and qi are both character strings of length 1 or more), there exists a problem that the runtime increases exponentially. In order to solve the problem, the processor 110 according to the exemplary embodiment of the present disclosure may utilize approximate information about the plurality of character strings included in the search target word set or the text information, and may perform search by utilizing approximated information. For example, the processor 110 according to the exemplary embodiment of the present disclosure may determine a word of which the edit distance from the search target word is equal to or less than the threshold among the words included in the text information by using a multi-string approximate (fuzzy) matching algorithm, such as the Multi-PEX algorithm.

According to the exemplary embodiment of the present disclosure, the processor 110 may, after searching for the search target word and the additional search target word in the speech recognition result text information, perform, in consideration of user input information input in a change word input item N, an operation to change the search target word and the additional search target word to the inputted change word in bulk. For example, when "chairr" is input as the search target word, "cher", "chair", and the like may be additionally searched as the additional search target words, and when "chair" is input as a change word after the search, the processor 110 may change all the words, "cher", "chair", "chairr", and the like to "chair" in bulk.

The processor 110 according to the exemplary embodiment of the present disclosure as discussed above may solve technical problems related to search in the field of speech recognition. Specifically, the speech recognition result text is incomplete because there are many errors in which only a portion is incorrect (for example, substitution error among the error types of substitution, deletion, and insertion errors used to calculate CER), and there may occur a problem in that a word is not searched despite the word is similar to the word that the user wants to search for because the word is not exactly the same word, and the processor 110 according to the exemplary embodiment of the present disclosure may solve the foregoing errors by determining an additional search target word (similar word) is similar to the search target word based on the edit distance.

Figure 10:
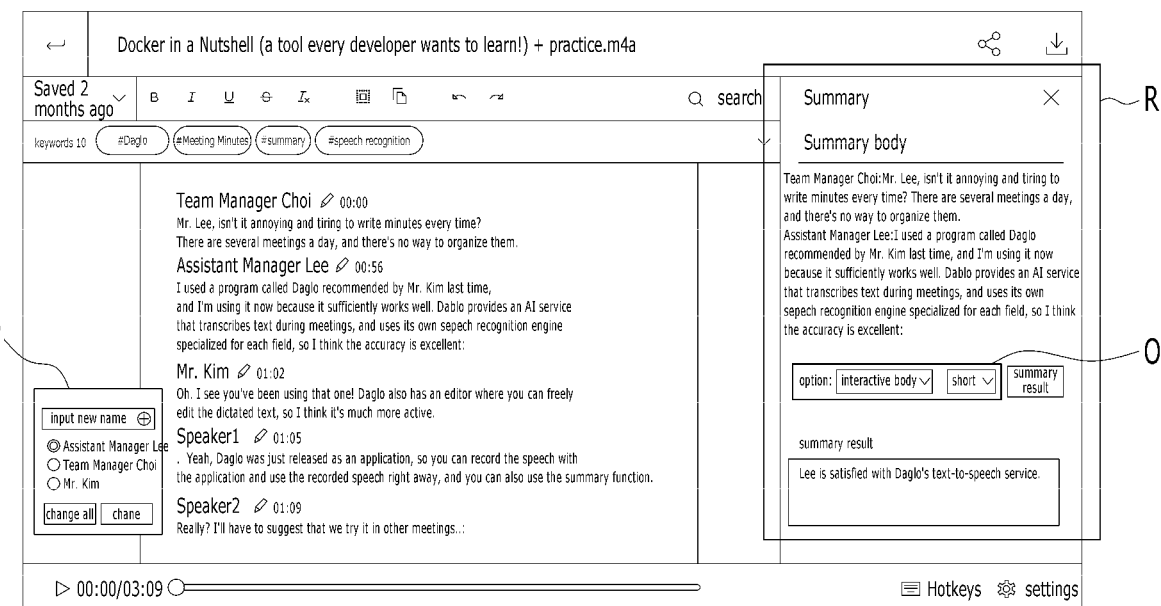
FIG. 10 is a diagram illustrating an example of a user interface screen for generating and displaying summarization information of text information according to the exemplary embodiment of the present disclosure.

FIG. 10 is a diagram illustrating an example of a user interface screen which generates and displays summarization information for text information (for example, speech recognition result text information) according to the exemplary embodiment of the present disclosure. For example, FIG. 10 is a diagram for describing a summarization module that generates summarization information about the text information based on at least one of a summarization range set in relation to the text information, speaker information about the text information, or topic information about the text information.

According to the exemplary embodiment of the present disclosure, the processor 110 may generate summarization information R for the text information based on at least one of a summarization range set in relation to the text information, speaker information for the text information, and topic information for the text information. For example, the processor 110 may summarize the text using a text summarization model. The range of summarization may include a range of various sentences in response to a criteria set by a user. Further, the processor 110 may generate summarization information for each speaker by using a speaker separation model. In this case, the speaker separation model may be implemented in the form of a model that analyzes the type of spectrogram for the original speech, a model that analyzes the size, amplitude, frequency, and the like of the plurality of speech signals included in the original speech, a statistical acoustic model, and the like. Additionally, the processor 110 may generate summarization information by grouping sentences with similar topics together by using a topic segmentation model that breaks down full text information into shorter and thematically coherent chunks. The processor 110 may differentially display topic information for text information, such as by breaking up paragraphs, and painting background colors for sections.

In an example, the processor 110 may determine a type Q of the summarization target text included in an option item. Further, the processor 110 may also receive setting information for the type Q of the summarization target text through a user interface. In particular, the processor 110 may determine whether the type of the summarization target text is a prose type (for example, when there is little speaker variation, such as in a journal entry, and lecture) or an interactive type. Further, the processor 110 may apply different summarization algorithms based on the determined type. For example, when the type of summarization target text is the interactive type, summarization may be performed so that the summarization result includes the name of the speaker, such as "Assistant Manager Lee is ~~". In this case, the determination of the type Q of summarization target text has the effect of providing more appropriate summarization results. Meanwhile, the processor 110 may receive setting information Q regarding the length of the summarization result included in the option item. Further, the processor 110 may determine at least one of the number of paragraphs, the number of sentences, and the number of words included in the summarization result based on the setting information regarding the length of the summarization result. According to the exemplary embodiment, the processor 110 may output a one-sentence summarization result when the length of the summarization result is selected as "short," and may output a three-sentence summarization result when the length of the summarization result is selected as "medium," and may output a five-sentence summarization result when the length of the summarization result is selected as "long". However, the present disclosure is not limited thereto.

According to the exemplary embodiment of the present disclosure, the processor 110 may separate text included in the text information (for example, speech recognition result text) by speaker. In this case, the processor 110 may separate the text included in the text information by speaker based on the separation of the speech signals of the original speech that is the basis of the text information by speaker. In addition, the processor may perform the speaker separation operation by using a model that analyzes the type of spectrogram for the original speech, a model that analyzes the size, amplitude, frequency, and the like of the plurality of speech signals included in the original speech, a statistical acoustic model, and the like. For example, the processor 110 may identify the speech signal of each of the one or more users in each of the one or more utterance sections included in the original speech. Further, the processor 110 may determine a user making an utterance, in which a size of the speech is equal to or greater than a predetermined size in the speech signal of each of the one or more identified users, as a particular speaker corresponding to the speech data. More specifically, when a size of a speech of a specific user among the speech of one or more users included in the speech data is equal to or greater than a predetermined size, the processor 110 may determine the specific user as a specific speaker corresponding to the speech data. For example, when speech data including speeches of two users (user A and user B) is received, the processor 110 may determine that the size of the speech of user A is greater than or equal to a predetermined size, and may determine user A as a first speaker. Further, the processor 110 may determine a specific speaker corresponding to the speech data based on a comparison size of the speech of each of the one or more users included in the speech data. For example, when the processor 110 receives speech data that includes the speeches of two users (user A and user B), the processor 110 may determine that the size of the speech of user B among the speeches of the two users included in the speech data is larger than the size of the speech of user A, and determine user B as a second speaker. The particular descriptions for the one or more users and the size of the speech of each of the one or more users are only examples, and the present disclosure is not limited thereto.

The processor 110 may determine or correct a name of a speaker associated with the separated text. For example, the processor 110 may output a text result by giving a predetermined name, such as Speaker 1, Speaker 2, . . . , for each speaker determined by the model according to the speaker separation result, and correct the name of the speaker in consideration of information input through the user interface. In this case, the processor 110 may display a list P of determined or corrected speakers with respect to the preceding text portion. In addition, the processor 110 may also further display the speaker having the highest probability from the above displayed list of speakers. Additionally, the processor 110 may finally determine or correct the name of the speaker associated with the separated text based on input information received through the user interface. For example, the processor 110 may recommend a speaker name when a speaker name in a later portion of text is corrected based on the speaker name input in the preceding portion of the text. More specifically, referring to FIG. 10, when a user attempts to additionally enter a speaker name for Speaker 1 that is the text portion, in which the speaker is separated, after the names of the speakers, such as Team Manager Choi, Assistant Manager Lee, and Mr. Kim, have been entered in association with the preceding text portion, the processor may suggest the previously entered speaker names as candidates, and further specify and suggest "Assistant Manager Lee" having the highest possibility among the candidates. In this case, the speaker separation model may identify the speaker name having the highest possibility for the additional separated text portion, based on the previously analyzed information and the input information. For example, the speaker separation model may identify, based on the analysis of the speech signal, that the additionally separated text portion corresponds to Speaker 1, and when the speaker name has been entered as "Assistant Manager Lee" in connection with the text portion separated as Speaker 1, the processor 110 may specify and suggest (recommend) "Assistant Manager Lee" that is the speaker name having the highest possibility. In the meantime, the user may also enter a speaker name directly into an input window without selecting the speaker suggested by the processor 110. In addition, the user may additionally enter a new speaker name that has not previously appeared. Further, the processor 110 may receive input via the user interface as to whether to apply all of the speaker name changes for the same speaker (for example, Speaker 1) at once (Replace All) or only one time (Replace) in the future.

According to the exemplary embodiment of the present disclosure, when a word is selected within the speech recognition result text information, the processor 110 may display a candidate word to replace the selected word based on at least one of information related to the speech recognition or information on interworking with an external server.

For example, when a user selects (for example, clicks or hovers) a specific word, the processor 110 may display words having confidence, that is, the predicted accuracy, or a high probability that the predicted word is the correct answer among the words that have been predicted to generate the text generated by speech recognition in response to a specific word as candidate words. For example, during the beam search process of the decoder of the speech recognition model for the utterance speech "we", three words "we", "wi", and "wie" may have been suggested as candidates for the corresponding token. In this case, the confidence of "we", "wi", and "wie" for the corresponding token is 0.61, 0.54, and 0.51, and "we" having the highest confidence might have been output as the text generated by the speech recognition. In this case, the processor 110 may receive user input information selecting "we" included in the text information, and may display the words, such as "wi" and "wie" that have relatively high confidence (compared to other candidates) based on the information related to the speech recognition as candidate words.

The processor 110 may derive words related to the user-selected word through the interworking with an external server and display the derived words as candidate words. For example, the processor may Google the word selected by the user and display other suggested words that appear in the search results as candidate words. According to the exemplary embodiment, when user input information selecting at least one word included in the text information is "gorona", the processor may suggest the candidate word "corona" as a result of a search through an external server, Google.

According to the exemplary embodiment of the present disclosure, the processor 110 may calculate confidence for each of the words included in the text information in connection with the speech recognition to identify and display words of which confidence is equal to or less than a threshold. More specifically, the processor 110 may calculate confidence of each of the words included in the text information in relation to the speech recognition. Further, the processor 110 may identify words of which confidence is equal to or less than a threshold among the words included in the text information. Further, the processor 110 may distinguish and display the identified words. For example, the processor 110 may compare the confidence of each word included in the text information with a threshold (for example, 0.7) and change the display manner (for example, highlight, or bold) for the words of which the confidence is less than the threshold. Additionally, the processor 110 may not provide candidate words (as discussed before) for every word included in the text information, but also provide candidate words only for words of which confidence is less than the threshold. Specifically, the processor 110 may distinguish or display and provide words of which confidence related to the speech recognition is less than a threshold, among the word included in the speech recognition result text information, and when the user selects (for example, clicks or hovers) a specific word among the words provided (i.e., the words of which confidence related to the speech recognition is less than the threshold), the processor 110 may provide candidate words associated with the selected specific word. In this case, the processor 110 may provide words of which confidence has been relatively high (although lower than the confidence of the selected specific word, but higher compared to other predicted words) among words that were predicted during the speech recognition process with respect to the speech signal corresponding to the selected specific word as candidate words, as mentioned above. On the other hand, the processor 110 may not provide a candidate word when other words are selected that are not provided by the above distinguishing or display.

Hereinafter, a flow of the operation of the present disclosure will be described in brief based on the details described above.

Figure 11:
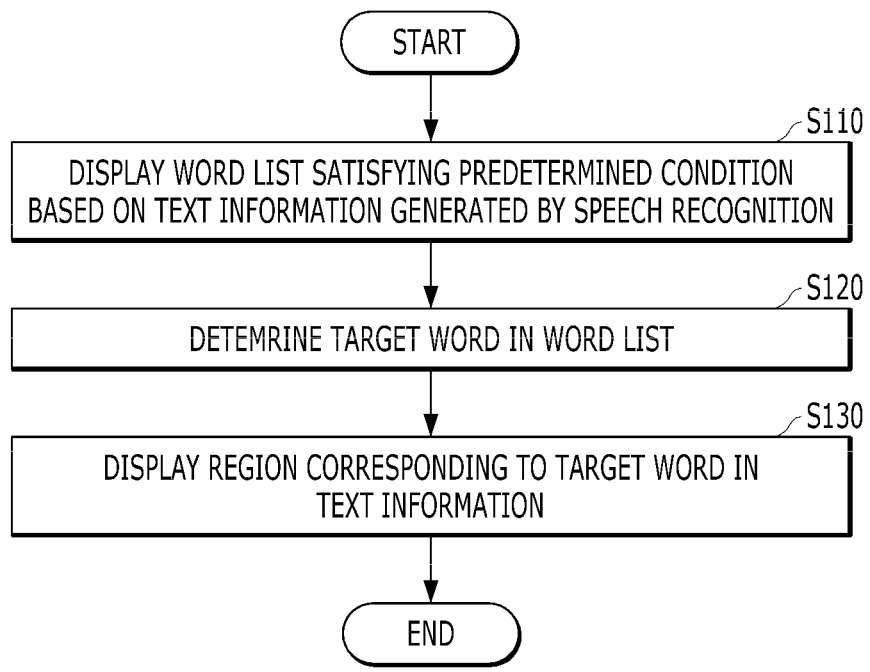
FIG. 11 is a schematic flow diagram of a method of editing a speech recognition result according to an exemplary embodiment of the present disclosure.

FIG. 11 is a schematic flow diagram of a method of editing a speech recognition result according to an exemplary embodiment of the present disclosure.

A method of editing a speech recognition result illustrated in FIG. 11 may be performed by the previously described computing device 100. Accordingly, the description of the computing device 100 may be equally applicable to the description of the method of editing the speech recognition result, even if omitted hereinafter.

Referring to FIG. 11, a method of editing a recognition result according to an exemplary embodiment of the present disclosure may include displaying a word list satisfying a predetermined condition based on text information generated by speech recognition (S110), determining a target word within the word list (S120), displaying a region corresponding to the target word within the text information (S130), and the like, and the predetermined condition may include at least one of predetermined word information for each user account and predetermined threshold information in relation to a frequency of occurrence of the word, and the method may include various other operations in addition to these operations.

In the above description, operations S110 to S130 may be further divided into additional operation or combined into fewer operations, depending on the implementation exemplary embodiment of the present disclosure. Further, some operations may be omitted as desired, and the order of the operations may be changed.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 12:
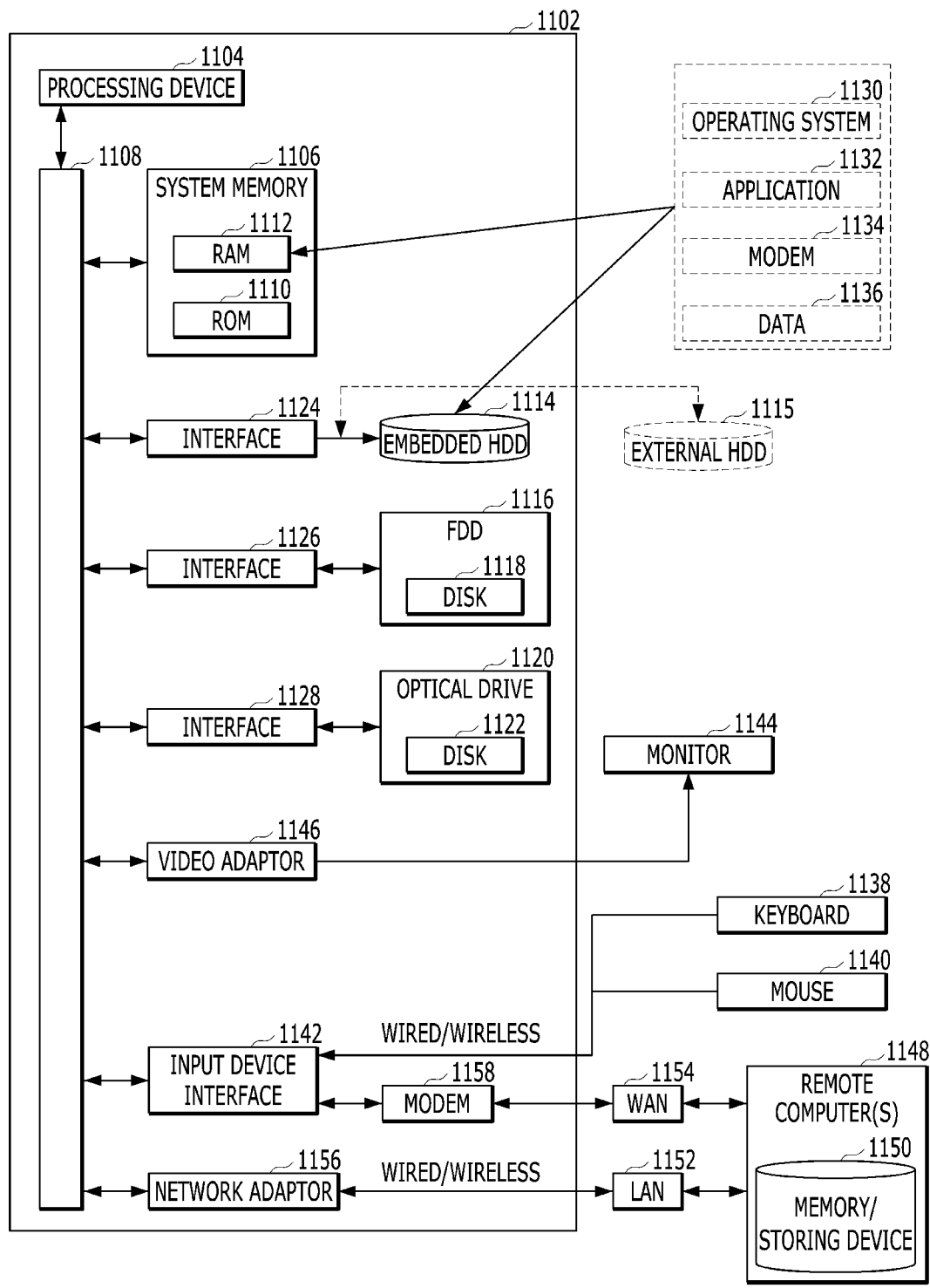
FIG. 12 is a brief and general schematic diagram illustrating an example of a computing environment in which exemplary embodiments of the present disclosure may be implemented.

FIG. 12 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method of editing a speech recognition result, the method being performed by a computing device including at least one processor,
the method comprising:
displaying a word list satisfying a predetermined condition based on text information generated by speech recognition, wherein the word list is displayed adjacent to the text information;
performing at least one of an action of determining a target word within the word list or an action of receiving input of a target word through a user interface;
displaying a region corresponding to the target word in the text information;
determining a dynamic threshold for the target word based on a length of the target word;
calculating an edit distance between the target word and an additional search target word;
determining that the additional search target word is similar to the target word based on the edit distance being equal to or less than a dynamic threshold;
searching for both the target word and the additional search target word in the text information; and
after searching for both the target word and the additional search target word, changing, in bulk, the target word and the additional search target word to an inputted change word,
wherein the predetermined condition includes at least one of predetermined word information for each user account or predetermined threshold information associated with a frequency of occurrence of a word.

2. The method of claim 1, further comprising:
when the region corresponding to the target word is selected, displaying information concerning a speech frame synchronizable with the region corresponding to the target word together among speech frames of an original speech that is a target of the speech recognition.

3. The method of claim 1, wherein the speech recognition is performed on a speech included in a video, and wherein the method further includes, when the region corresponding to the target word is selected, displaying information concerning an image frame synchronizable with the region corresponding to the target word together among image frames of the video.

4. The method of claim 1, further comprising:
performing a correction on at least one word in the text information based on input information received through a user interface; and
changing a display manner for a partial region within the text information based on the input information received through the user interface.

5. The method of claim 4, further comprising:
converting corrected text information, in which the correction of the at least one word and the change of the display manner for the partial region are reflected, into a format for an external program.

6. The method of claim 1, further comprising:
generating summarization information about the text information based on at least one of a summarization range set in relation to the text information, speaker information about the text information, and topic information about the text information.

7. The method of claim 6, wherein the generating of the summarization information includes:
determining whether a type of summarization target text is a prose type or an interactive type; and
applying a summarization algorithm differently depending on the determined type.

8. The method of claim 6, wherein the generating of the summarization information includes:
receiving setting information regarding a length of a summarization result; and
determining, based on the setting information regarding the length of the summarization result, at least one of the number of paragraphs, the number of sentences, or the number of words included in the summarization result.

9. The method of claim 1, further comprising:
separating text included in the text information by speaker; and
determining or correcting a name of a speaker associated with the separated text.

10. The method of claim 9, wherein the determining or correcting of the name of the speaker associated with the separated text includes:
displaying a list of determined or corrected speakers in relation to a preceding text portion;

additionally displaying a speaker having the highest probability in the displayed list of speakers; and finally determining or correcting, based on input information received through a user interface, the name of the speaker associated with the separated text.

11. The method of claim 1, further comprising:

receiving user input information selecting at least one word included in the text information; and displaying a candidate word for replacing the selected word, based on at least one of information related to the speech recognition or information on interworking with an external server.

12. The method of claim 11, wherein the displaying of the candidate word for replacing the selected word includes:

identifying a speech signal portion corresponding to the selected word;

identifying another predicted word considered as speech recognition prediction result corresponding to the identified speech signal portion; and displaying the other identified predicted word as the candidate word.

13. The method of claim 1, further comprising:

calculating confidence of each of the words included in the text information in connection with the speech recognition;

identifying, among the words included in the text information, a word of which confidence is equal to or less than a threshold; and distinguishing and displaying the identified word.

14. A computer program stored in a non-transitory computer-readable storage medium, wherein when the computer program is executed by one or more processors, the computer program performs following operations for editing a speech recognition result, the operations comprising:

an operation of displaying a word list satisfying a predetermined condition based on text information generated by speech recognition, wherein the word list is displayed adjacent to the text information;

an operation of performing at least one of an action of determining a target word within the word list or an action of receiving input of a target word through a user interface;

an operation of displaying a region corresponding to the target word in the text information;

an operation of determining a dynamic threshold for the target word based on a length of the target word;

an operation of calculating an edit distance between the target word and an additional search target word;

an operation of determining that the additional search target word is similar to the target word based on the edit distance being equal to or less than the dynamic threshold;

an operation of searching for both the target word and the additional search target word in the text information;

an operation of, after searching for both the target word and the additional search target word, changing, in bulk, the target word and the additional search target word to an inputted change word, wherein the predetermined condition includes at least one of predetermined word information for each user account or predetermined threshold information associated with a frequency of occurrence of a word.

15. A computing device, comprising:

at least one processor; and a memory, wherein the at least one processor:

displays a word list satisfying a predetermined condition based on text information generated by speech recognition, wherein the word list is displayed adjacent to the text information, performs at least one of an action of determining a target word within the word list or an action of receiving input of a target word through a user interface, displays a region corresponding to the target word in the text information, determines a dynamic threshold for the target word based on a length of the target word, calculates an edit distance between the target word and an additional search target word, determines that the additional search target word is similar to the target word based on the edit distance being equal to or less than the dynamic threshold, searches for both the target word and the additional search target word in the text information, after searching for both the target word and the additional search target word, changes, in bulk, the target word and the additional search target word to an inputted change word, wherein the predetermined condition includes at least one of predetermined word information for each user account or predetermined threshold information associated with a frequency of occurrence of a word.

* * * * *